(12) United States Patent
Jung et al.

(10) Patent No.: US 10,499,400 B2
(45) Date of Patent: Dec. 3, 2019

(54) METHOD FOR DEVICE-TO-DEVICE (D2D) OPERATION PERFORMED BY TERMINAL IN WIRELESS COMMUNICATION SYSTEM, AND TERMINAL USING THE METHOD

(71) Applicant: LG ELECTRONICS INC., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/752,860

(22) PCT Filed: Aug. 17, 2016

(86) PCT No.: PCT/KR2016/009037
§ 371 (c)(1),
(2) Date: Feb. 14, 2018

(87) PCT Pub. No.: WO2017/030368
PCT Pub. Date: Feb. 23, 2017

(65) Prior Publication Data
US 2018/0249455 A1 Aug. 30, 2018

Related U.S. Application Data

(60) Provisional application No. 62/232,431, filed on Sep. 24, 2015, provisional application No. 62/206,203, filed on Aug. 17, 2015.

(51) Int. Cl.
*H04W 72/04* (2009.01)
*H04W 48/16* (2009.01)
(Continued)

(52) U.S. Cl.
CPC ........ *H04W 72/048* (2013.01); *H04W 48/08* (2013.01); *H04W 48/16* (2013.01);
(Continued)

(58) Field of Classification Search
None
See application file for complete search history.

(56) References Cited

U.S. PATENT DOCUMENTS

2014/0242963 A1* 8/2014 Novlan ............... H04W 48/16
455/418
2015/0043448 A1* 2/2015 Chatterjee .......... H04W 8/005
370/329
(Continued)

FOREIGN PATENT DOCUMENTS

| WO | 2012159270 | 11/2012 |
| WO | 2015046944 | 4/2015 |
| WO | 2015115847 | 8/2015 |

OTHER PUBLICATIONS

ZTE, "Resource Allocation for Type 1 Discovery," R1-142231, 3GPP TSG-RAN WG1 #76bis, Seoul, Korea, May 10, 2014, see section 3.
(Continued)

*Primary Examiner* — Brian S Roberts
*Assistant Examiner* — Cassandra L Decker
(74) *Attorney, Agent, or Firm* — Dentons US LLP

(57) ABSTRACT

Provided are a D2D operation method performed by a terminal in a wireless communication system and a terminal using the method. The method is characterized by obtaining a D2D setting for a cell in a non-serving frequency, and determining the validity of the D2D setting. The D2D setting can be obtained by the terminal from the cell in the non-serving frequency or from a serving cell of the terminal.

11 Claims, 21 Drawing Sheets

(51) Int. Cl.
*H04W 68/00* (2009.01)
*H04W 48/08* (2009.01)
*H04W 68/02* (2009.01)

(52) U.S. Cl.
CPC ......... *H04W 68/005* (2013.01); *H04W 68/02* (2013.01); *H04W 72/0453* (2013.01)

(56) References Cited

U.S. PATENT DOCUMENTS

| | | | | |
|---|---|---|---|---|
| 2015/0208332 A1* | 7/2015 | Baghel | .................. | H04W 48/16 370/255 |
| 2016/0037488 A1* | 2/2016 | Li | ......................... | H04W 76/14 370/329 |
| 2016/0205534 A1* | 7/2016 | Fujishiro | ............. | H04W 72/048 455/434 |
| 2017/0041773 A1* | 2/2017 | Fujishiro | ............... | H04W 8/005 |
| 2017/0295567 A1* | 10/2017 | Chen | .................... | H04W 76/11 |
| 2018/0077586 A1* | 3/2018 | Zhang | .................. | H04W 76/15 |

OTHER PUBLICATIONS

Intel Corporation, "On D2DSS Transmission for Inter-cell D2D Discover," R1-143758, 3GPP TSG RAN WG1 Meeting #78bis, Ljubljana, Slovenia, Sep. 27, 2014, see section 3.
3GPP TS 36.304 V8.5.0, Mar. 2009.

\* cited by examiner

METHOD FOR DEVICE-TO-DEVICE (D2D) OPERATION PERFORMED BY TERMINAL IN WIRELESS COMMUNICATION SYSTEM, AND TERMINAL USING THE METHOD

CROSS-REFERENCE TO RELATED APPLICATIONS

This application is the National Stage filing under 35 U.S.C. 371 of International Application No. PCT/KR2016/009037, filed on Aug. 17, 2016, which claims the benefit of U.S. Provisional Applications No. 62/206,203 filed on Aug. 17, 2015, and No. 62/232,431 filed on Sep. 24, 2015, the contents of which are all hereby incorporated by reference herein in their entirety.

BACKGROUND OF THE INVENTION

Field of the Invention

The present invention relates to wireless communication and more particularly, to a method for device-to-device (D2D) operation performed by a terminal in a wireless communication system and a terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a terminal may perform a D2D operation only at a current serving frequency or may also perform a D2D operation at a frequency different from the serving frequency. In this case, it is problematic how to receive the D2D configuration in the cell at the different frequency.

Moreover, if the terminal receives the D2D configuration in the cell at the different frequency from a serving cell of the terminal, when the D2D configuration in the cell at the different frequency is changed, the serving cell is unable to adapt to the change immediately. Therefore, the D2D configuration in the cell at the different frequency provided to the terminal may not be valid.

There needs a method and an apparatus for solving the problem above.

SUMMARY OF THE INVENTION

The present invention provides a method for D2D operation performed by a terminal in a wireless communication system and a terminal using the method.

In one aspect, provided is a method for D2D (Device-to-Device) operation performed by a UE in a wireless communication system. The method includes obtaining a D2D configuration for a cell in a non-serving frequency and determining validity of the D2D configuration.

If a paging message is received from the cell of the non-serving frequency, and if the paging message notifies of a change of the D2D configuration of the cell, the D2D configuration may be obtained from the cell.

The obtained D2D configuration for the cell may be reported to a serving cell of the UE.

A serving frequency at which the serving cell operates and the non-serving frequency may be different from each other.

System information including the D2D configuration may be received from the cell of the non-serving frequency. A change of the D2D configuration may be determined by comparing the D2D configuration with a previous D2D configuration, and if the D2D configuration has been changed from the previous D2D configuration, the change of the D2D configuration may be reported to a serving cell of the UE.

A message requesting acquisition and reporting of the D2D configuration may be received from the serving cell. The D2D configuration may be reported in response to the requesting message.

The D2D configuration for the cell of the non-serving frequency may be received from a serving cell of a serving frequency.

The terminal may further receive time information representing a time period during which the D2D configuration is valid.

If the valid time period is passed, the D2D configuration may be discarded.

If the valid time period is passed, a new D2D configuration may be requested from the serving cell.

The D2D configuration may further comprise information representing ID (identity) of the cell operating at the non-serving frequency to which the D2D configuration is applied.

In another aspect, provided is a user equipment (UE). The UE includes an RF (Radio Frequency) unit transmitting and receiving a radio signal and a processor operating being coupled with the RF unit. The processor is configured to obtain a D2D configuration for a cell in a non-serving frequency and to determine validity of the D2D configuration.

According to the present invention, a terminal may autonomously detect a change of the D2D configuration with respect to a cell at a frequency different from the serving frequency depending on the network setting. Also, when such a change is detected, the D2D configuration with respect to the changed cell may be reported to the serving cell. Since D2D operation in the cell is performed after validity of the D2D configuration with respect to the cell at the different frequency is checked, performance of the D2D operation against interference on the different cell is improved.

When the serving cell provides a D2D configuration with respect to a cell at the frequency different from the serving frequency, the serving cell helps determining validity of the D2D configuration by also providing information about a time period during which the D2D configuration is valid, information about cell ID, and so on.

DESCRIPTION OF EXEMPLARY EMBODIMENTS

Figure 1:
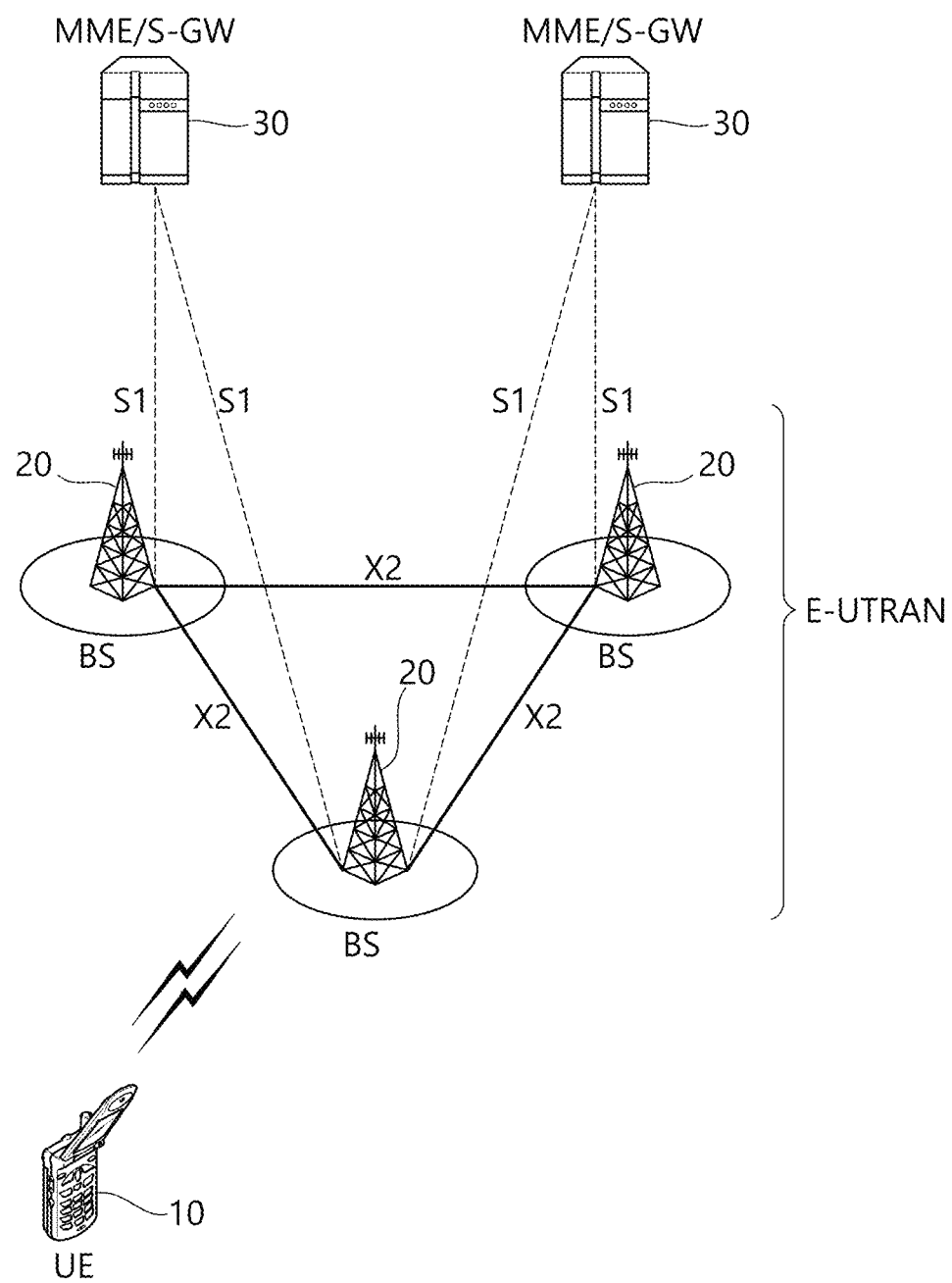
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
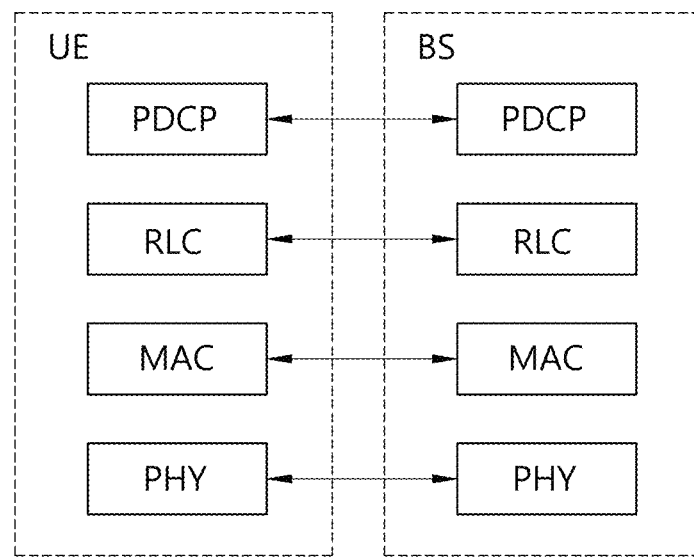
FIG. 2 is a diagram showing a wireless protocol architecture for a user plane.
Figure 3:
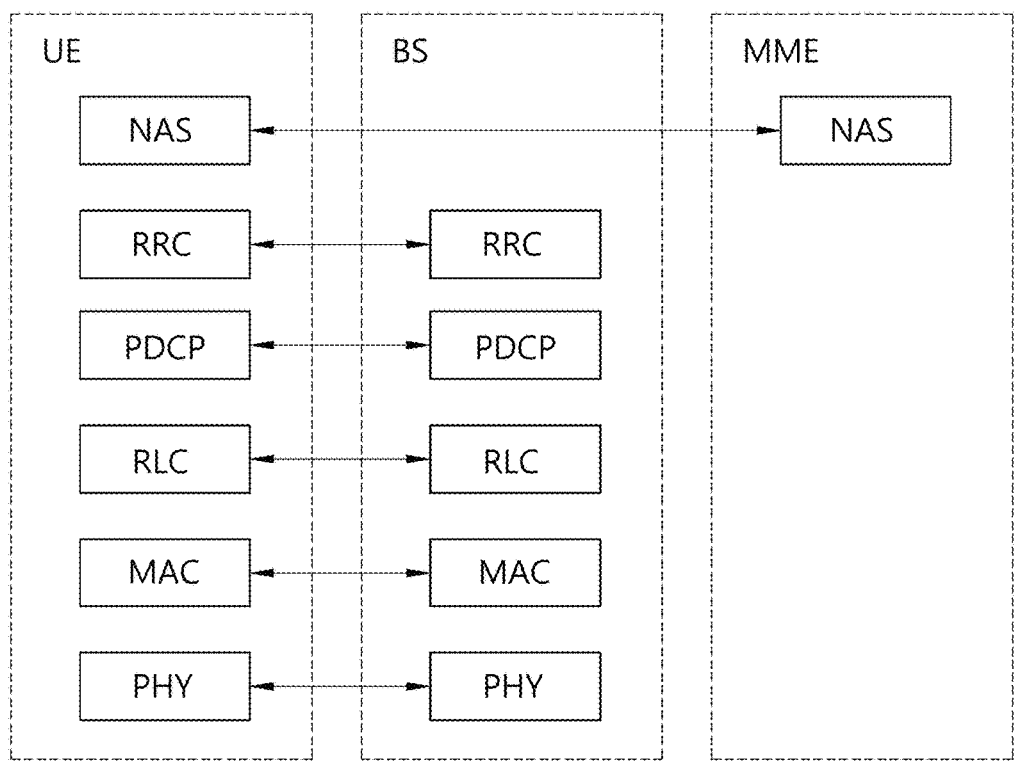
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
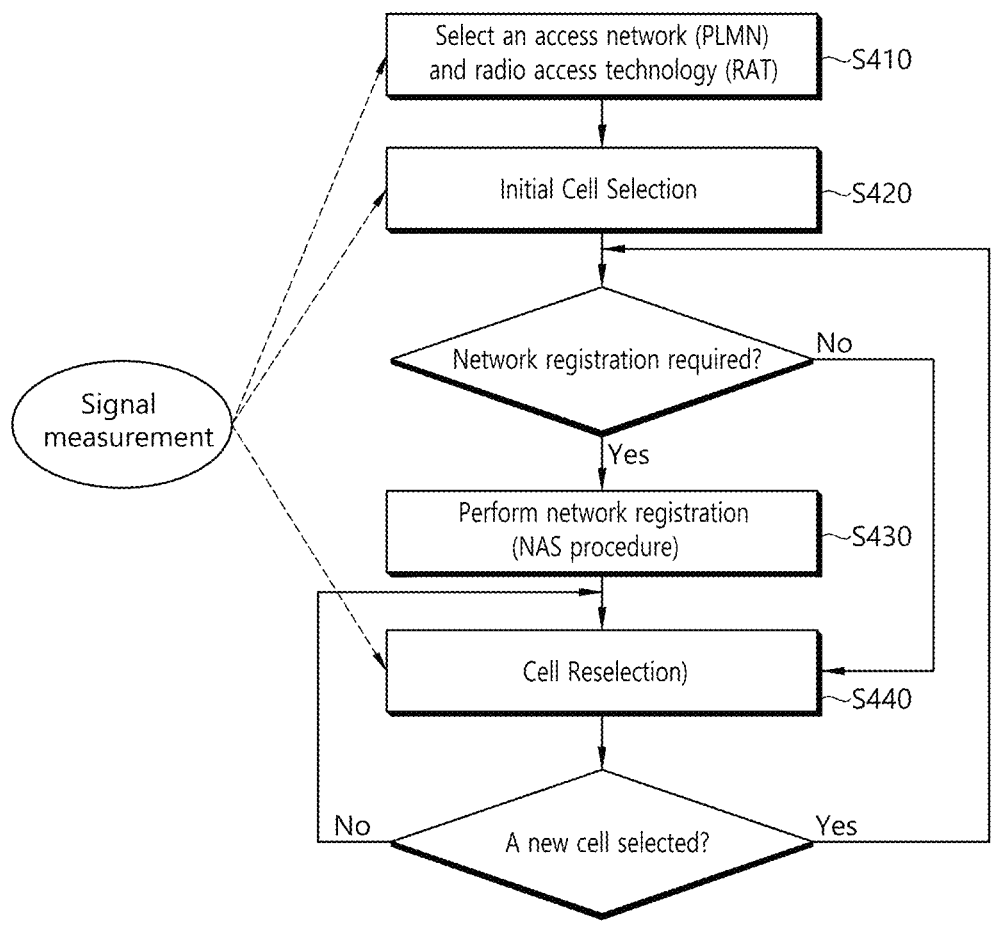
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
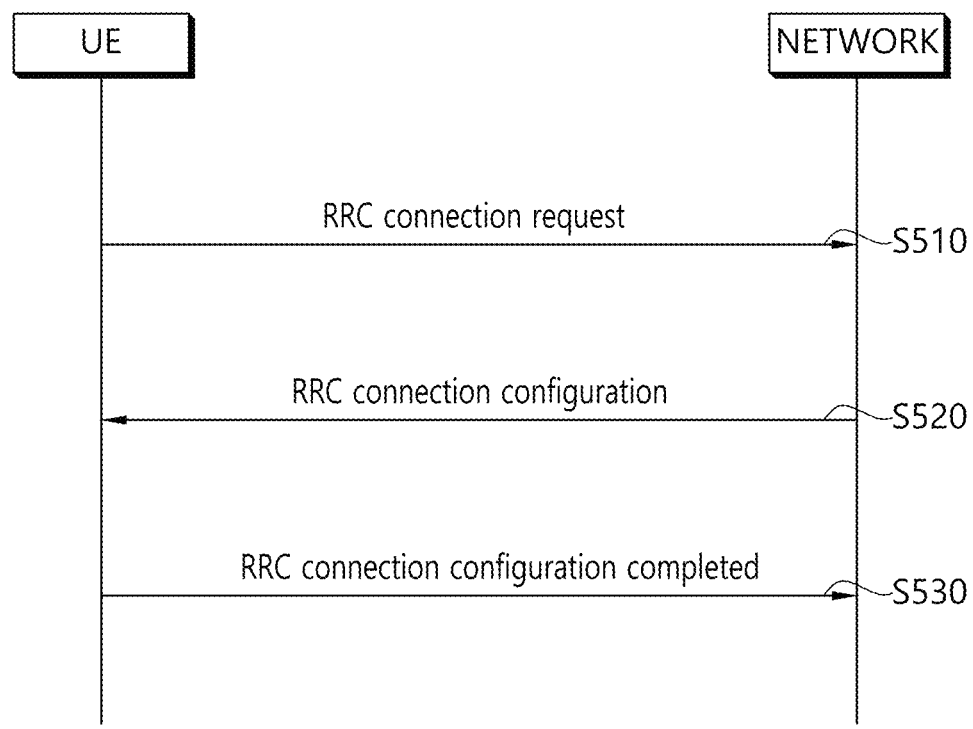
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
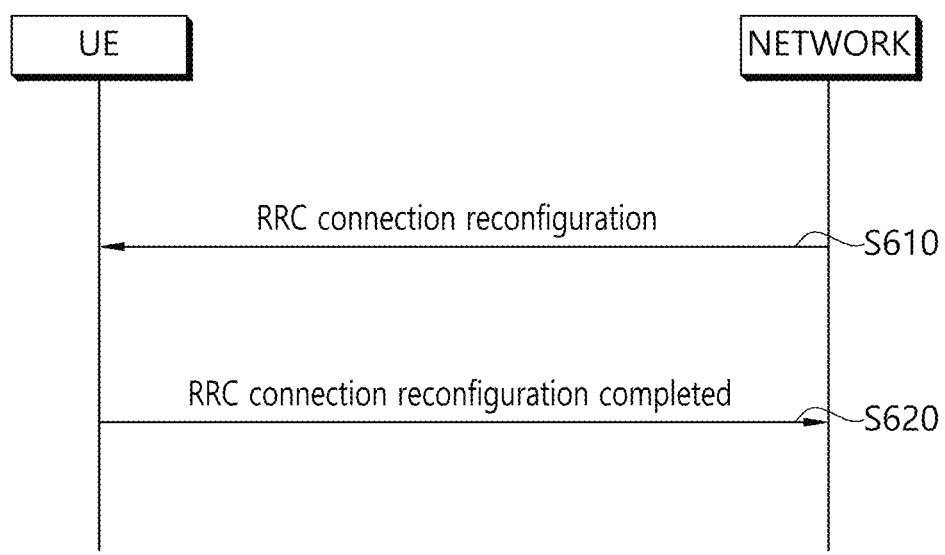
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev>0 \text{ AND } Squal>0 \quad \text{[Equation 1]}$$

where:

$Srxlev = Q_{rxlevmeas} - (Q_{rxlevmin} + Q_{rxlevminoffset}) - \text{Pcompensation}$ $Squal = Q_{qualmeas} - (Q_{qualmin} + Q_{qualminoffset})$ Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$ may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Q\text{meas},s + Q\text{hyst}, Rn = Q\text{meas},s - Q\text{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell res election.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
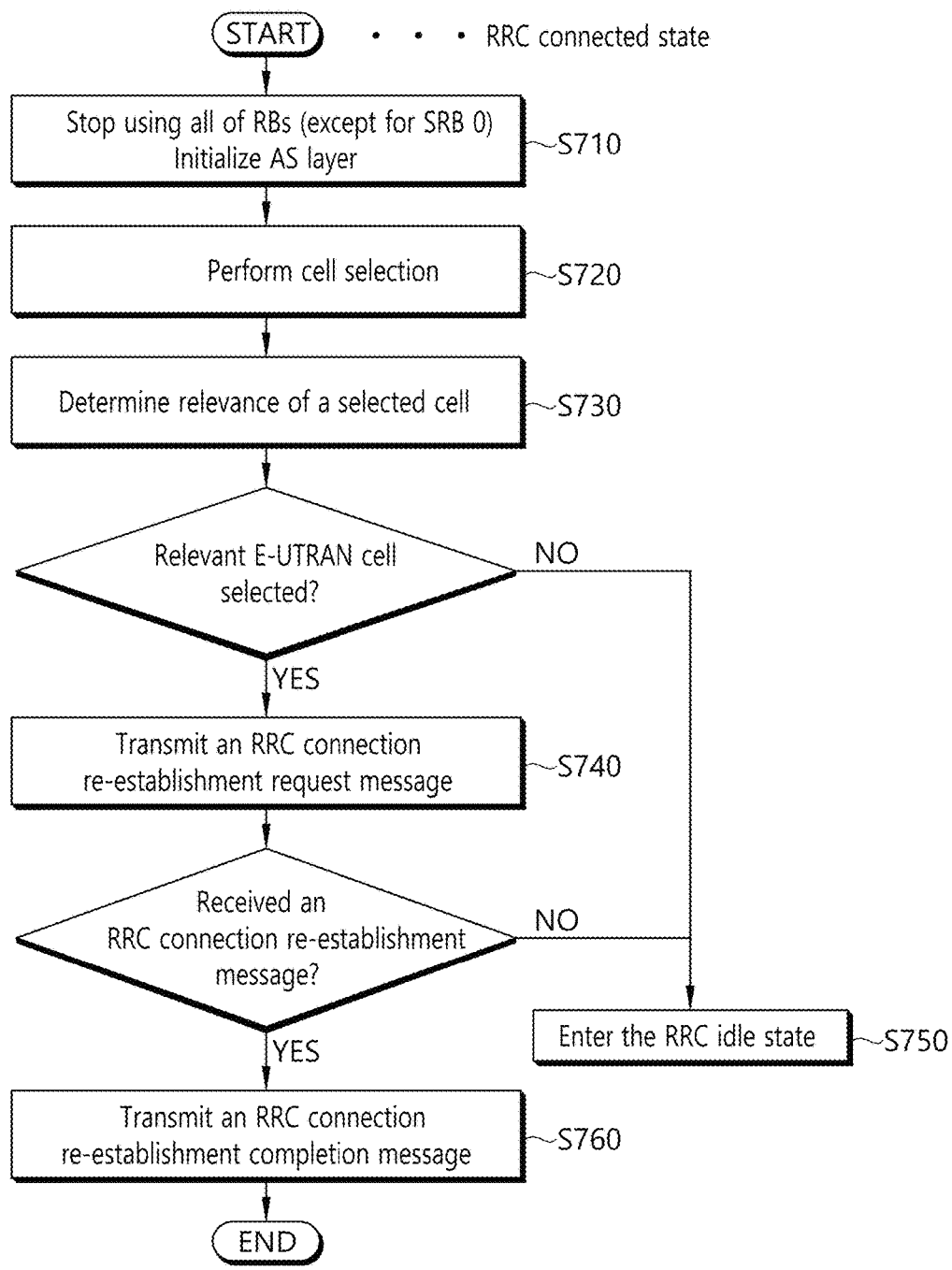
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
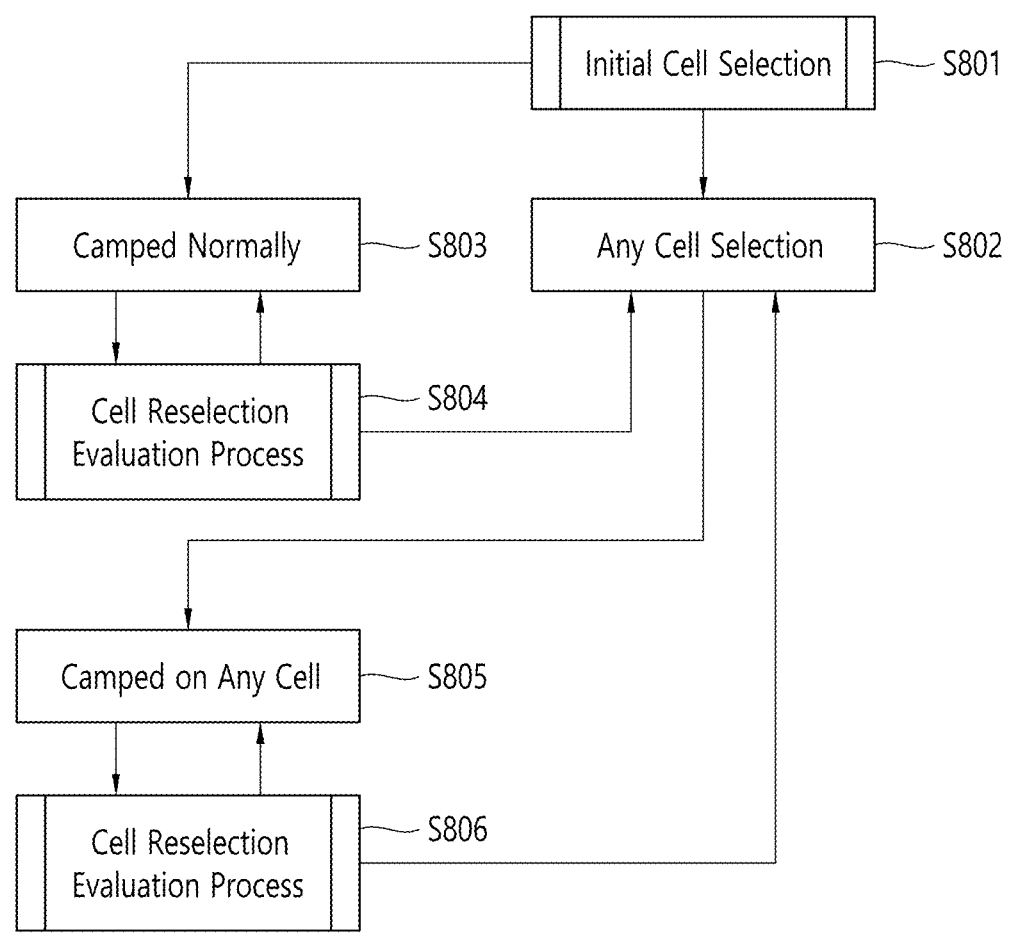
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity Hereinafter, for convenience, the ProSe direct communication may be referred to as D2D communication, and the ProSe direct discovery may be referred to as D2D discovery.

Figure 9:
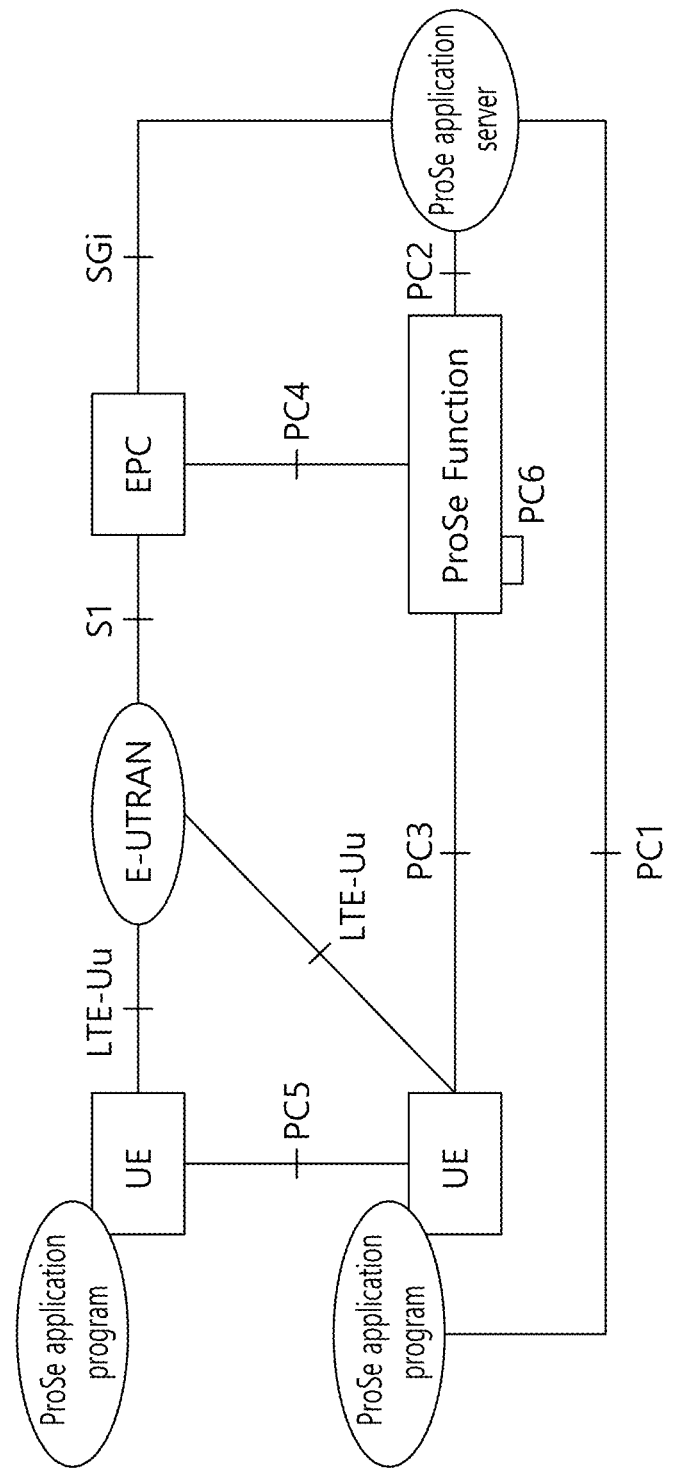
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
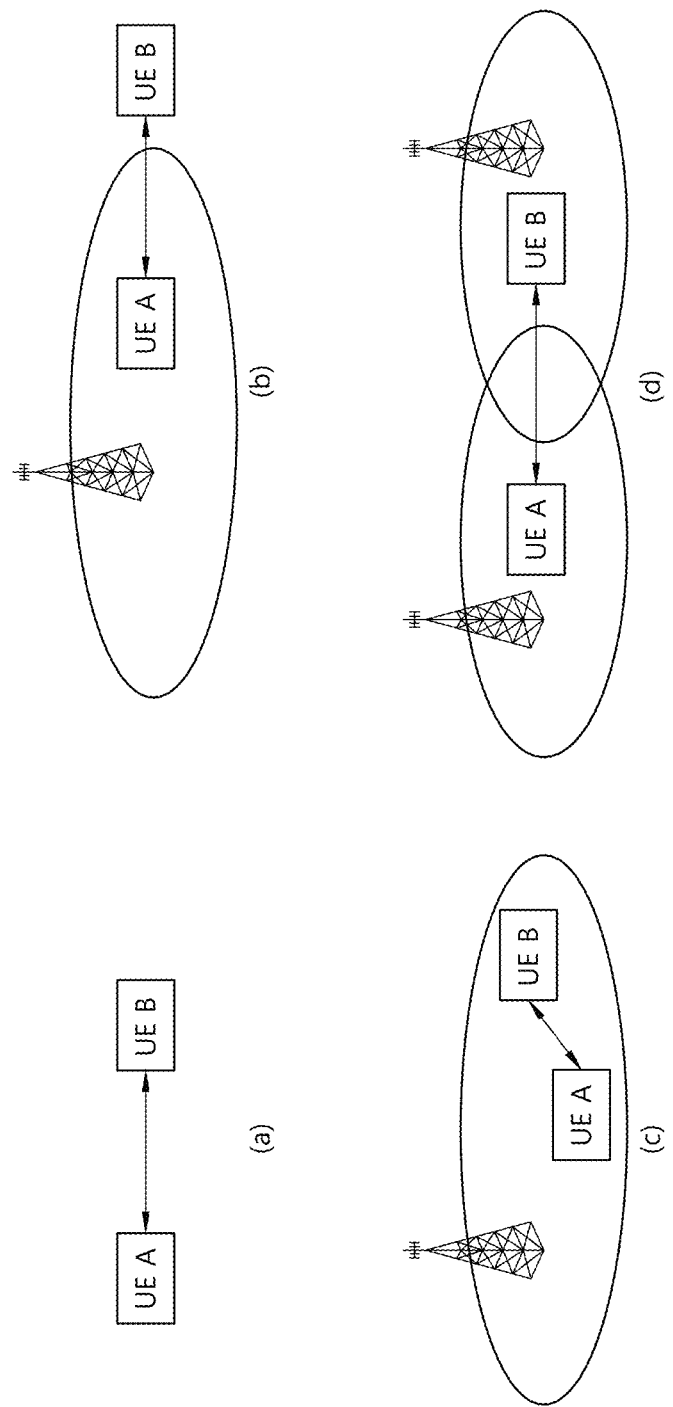
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
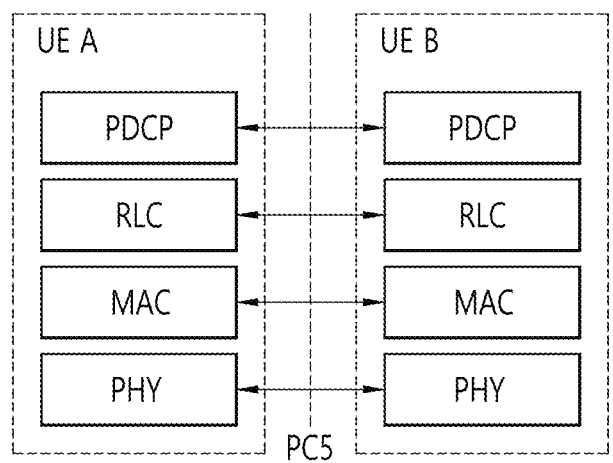
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
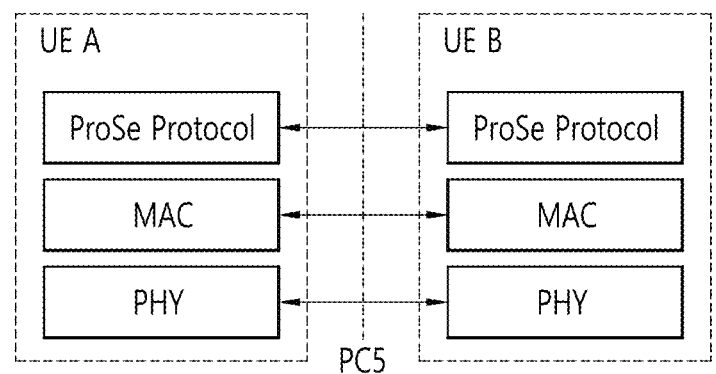
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
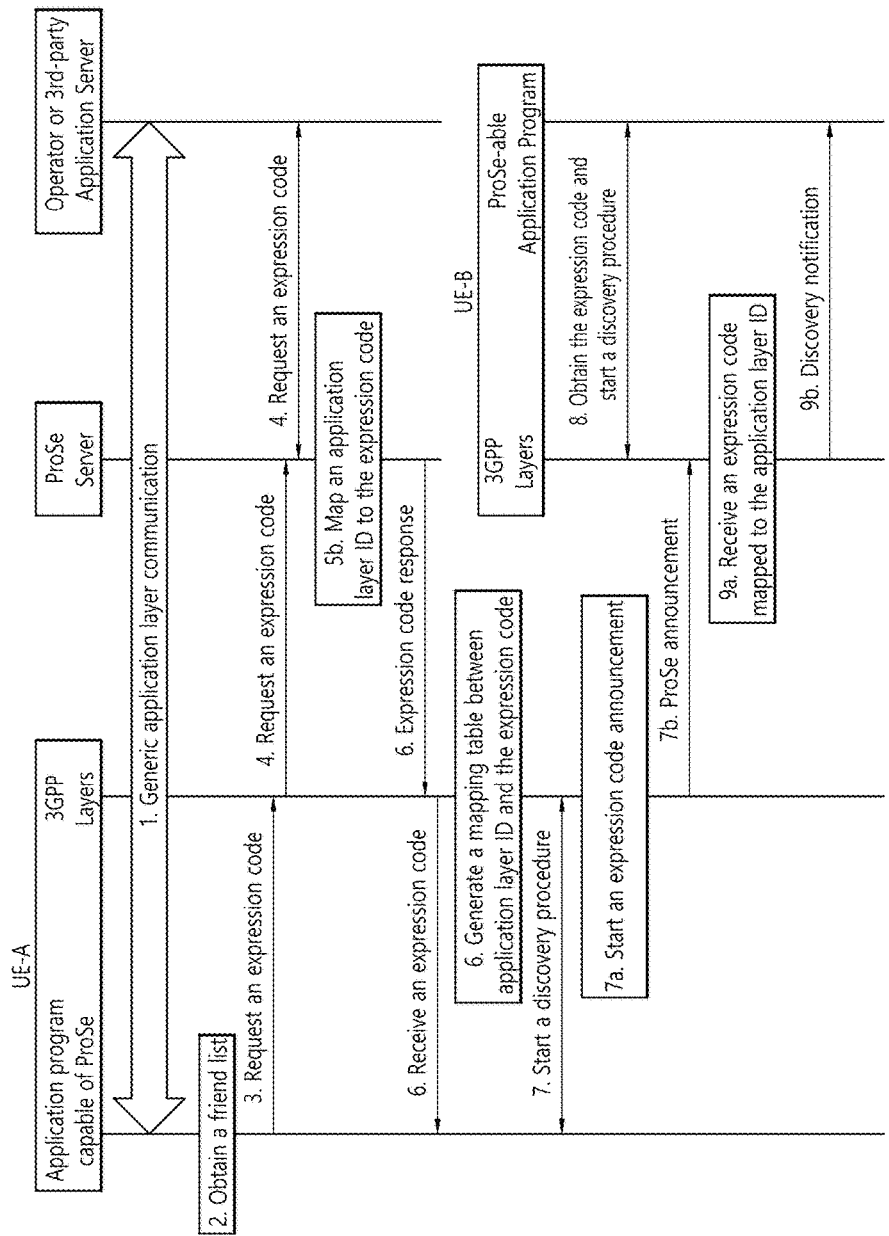
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543 #2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543 $#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
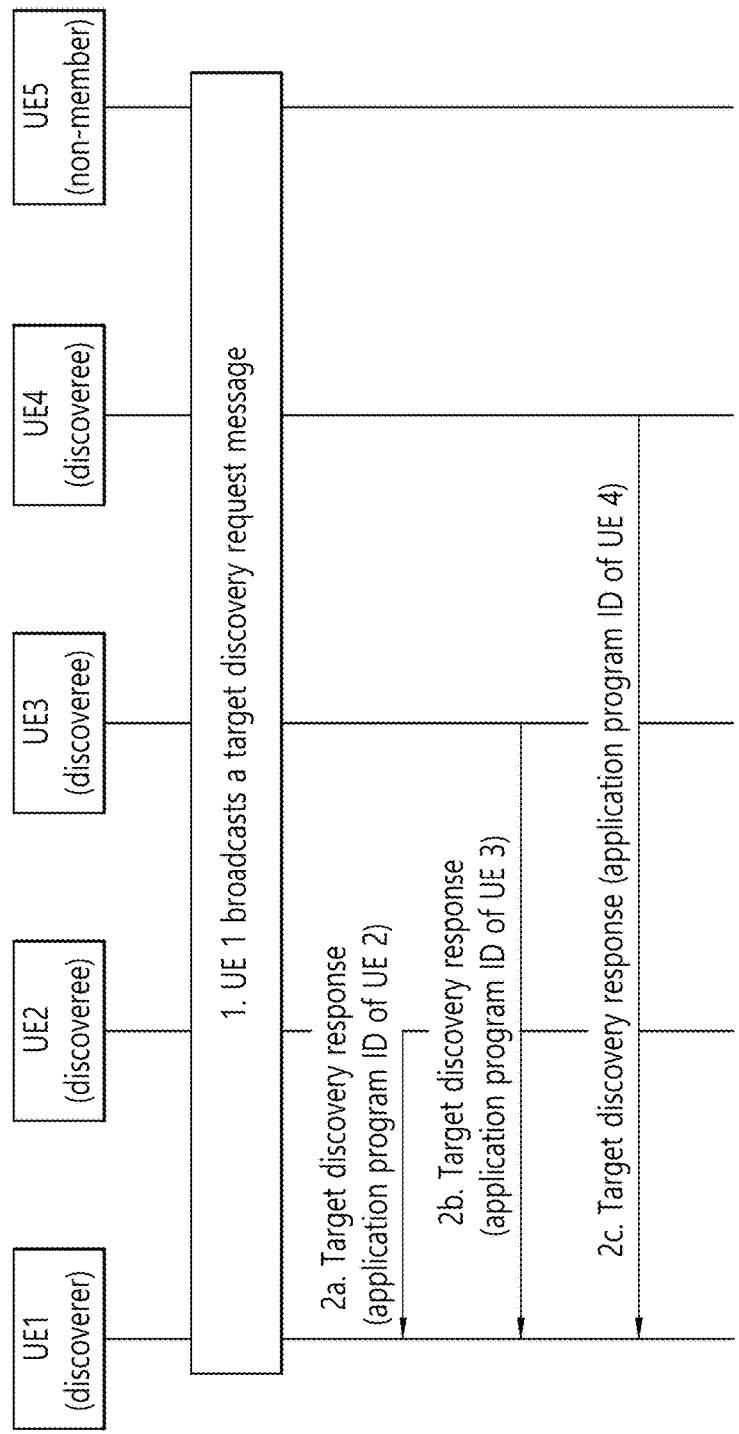
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

In what follows, D2D operation may correspond to D2D discovery or D2D communication. D2D discovery may be referred to simply as discovery, or ProSe discovery or sidelink discovery. Transmission of a D2D discovery signal may include the aforementioned discovery announcement. D2D communication may be referred to simply as communication, or ProSe communication or sidelink communication. Sidelink refers to the interface between UEs and may employ the PC5 protocol described above.

In what follows, the present invention will be described.

An eNB may receive sidelink UE information from a UE, which indicates that the UE is interested in D2D transmission (ProSe transmission). In this case, if the eNB is aware of the parameters about a transmission resource pool of a cell operating at the frequency in which the UE is interested in transmitting a discovery signal (more specifically discovery announcement), it is more natural for the eNB to inform the UE of the parameters, and for the UE to transmit the discovery signal through a different frequency by using signaled parameters.

For example, that is the case when the UE is interested in transmitting a discovery signal by using a secondary carrier component. In other words, it is preferable that the serving cell transmits assistance information about a cell operating at a different frequency through a dedicated signal. The assistance information may include parameters about a D2D transmission resource pool with respect to the cell operating at a different frequency.

On the other hand, if the serving cell (serving eNB) does not know the transmission resource pool parameters with respect to the 'frequency different from the serving frequency', in which the UE is interested for transmitting a discovery signal, the serving cell becomes unable to take into account the discovery signal transmission operation in uplink scheduling with respect to the UE. Then, every time the interval in which the UE attempts to transmit a discovery signal overlaps the uplink scheduling, the UE has to drop transmission of the discovery signal. This is so because uplink transmission has a higher priority than transmission of a discovery signal. Then the performance of discovery signal transmission will be degraded.

The serving cell may be configured to report the D2D configuration for discovery in a different cell rather than in the serving cell to the UE. In particular, that is the case when the serving cell does not know the D2D configuration of the different cell.

Meanwhile, the UE may use an invalid D2D configuration due to a change of the D2D configuration within SIB19 of a non-serving cell. For example, the UE uses an invalid D2D configuration when the D2D configuration is changed in a non-serving cell, but D2D transmission is performed before the serving cell reports the change to the UE.

In what follows, validation of sidelink setting with respect to a frequency different from a serving frequency, namely non-serving frequency will be described. Also, a method for identifying cells expected to request sidelink setting with respect to a non-serving frequency will also be described.

First, provision of resources for D2D operation (for example, resources for D2D discovery) at a non-primary frequency will be described.

For the D2D operation at a frequency different from the primary frequency, namely non-primary frequency, the network may indicate whether it is necessary for the UE itself to obtain/decode system information (for example, SIB19) at the non-primary frequency or whether it is necessary to request resources for the non-primary frequency from the serving cell.

For example, if the SIB19 does not provide a discovery transmission resource with respect to the allowed carrier components listed in the SIB19 (a list of carrier components allowed for D2D operation may be included in the SIB19), the network may inform of whether the UE itself has to read the SIB19 of a signaled carrier component or whether requesting a resource from the serving cell with respect to the signaled carrier component is expected.

The most immediate approach for implementing the method above is to introduce a flag for each frequency expected to request a D2D resource. The flag may be implemented with 1 bit.

Using a flag is efficient in that signaling overhead is not large. A bitmap may be introduced for signaling flags with respect to the individual, allowed frequencies (carrier components) of the list. In other words, 1 bit flags corresponding to the individual frequencies of the list are implemented in the form of a bitmap. Each bit of the bitmap may indicate whether requesting a resource with respect to the corresponding frequency is expected.

[Proposal 1] A bitmap may be introduced to the SIB19 of a cell to indicate at which frequency among the frequencies allowed for D2D transmission requesting a resource for D2D transmission is expected.

The proposal 1 may be applied for discovery transmission. Depending on whether a serving cell is aware of the reception resource pool setting of a frequency different from the serving frequency, the network may inform of whether a UE is able to request reception resources of the different frequency from the UE's serving cell or whether it is necessary for the UE to read the SIB19 of the different frequency.

[Proposal 2] Another bitmap may be introduced to the SIB19, which indicates at which frequency among the frequencies allowed for D2D reception a UE's requesting a resource for D2D reception is expected.

Figure 15:
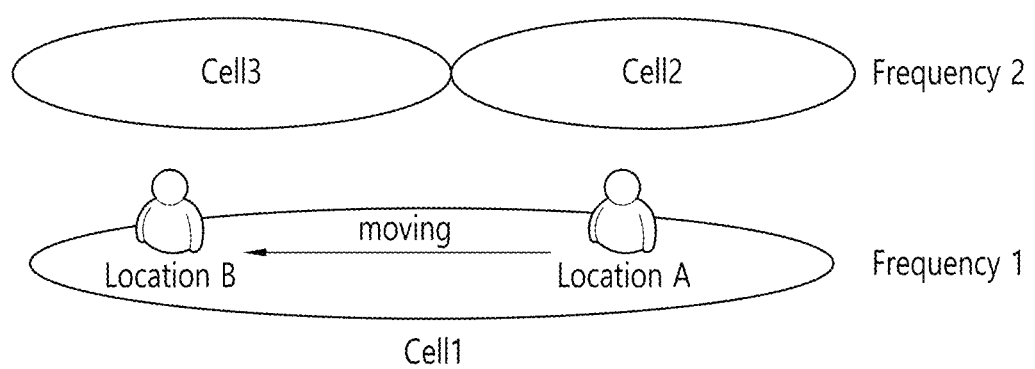
FIG. 15 illustrates an example in which a UE located within cell 1 of frequency 1 performs a D2D operation in cell 2 or cell 3 of frequency 2.

FIG. 15 illustrates an example in which a UE located within cell 1 of frequency 1 performs a D2D operation in cell 2 or cell 3 of frequency 2.

As shown in FIG. 15, the UE receives a service from the cell 1. In other words, cell 1 is a serving cell of the UE. Inside the cell 1, the UE may move from location A to location B. The UE may be interested in performing a D2D operation at frequency 2. Suppose the UE obtains the D2D configuration, which may be applied to the cell 2 operating at frequency 2 from the UE's serving cell, namely cell 1, when the UE is at location A. To obtain a D2D resource, the UE may transmit sidelink UE information to the UE's serving cell or obtain inter-carrier D2D configuration included in the D2D system information of the UE's serving cell. The inter-carrier D2D configuration may also be called inter-frequency D2D configuration. Inter-frequency D2D configuration may refer to the setting with respect to a D2D operation at a frequency different from the serving frequency (primary frequency). Which operation is performed is determined by the setting of the serving cell. In the case of D2D communication, the D2D system information may be SIB18 while, in the case of D2D discovery, the D2D system information may be SIB19.

If a neighbor cell does not have the same sidelink setting as that of a serving cell or synchronization is not perfectly matched between cells, the sidelink setting may be applicable only for a specific cell. This means that it is necessary for a UE to have a valid sidelink discovery setting depending on a geographic location of the UE at a specific frequency. When the UE is at location A, it is necessary for the UE to have a discovery setting that may be applied to the cell 2. On the other hand, when the UE is at location B, it is required to have a discovery setting that may be applied to cell 3. In other words, when the network signals a sidelink setting with respect to a different frequency, it may be needed to inform of which cell the sidelink setting may be applied to.

[Proposal 3] If a sidelink D2D configuration may be applied only to a specific cell operating at a frequency different from the serving frequency, the sidelink D2D configuration may inform of the information by which the specific cell may be identified, for example, ID of the specific cell (in the case of a plurality of specific cells, a list of the cells). In other words, ID of a cell (or a list of cells) for which the sidelink D2D configuration is applied may be transmitted by being included in the sidelink D2D configuration. For example, the D2D configuration may be D2D discovery setting.

[Proposal 4] Meanwhile, there may be a case in which the sidelink discovery setting may hold only a resource setting without the ID information of a cell for which the sidelink D2D configuration may be applied. In this case, the UE/network may interpret or regard the sidelink D2D configuration as being applicable to all of the cells of the corresponding frequency.

If the UE receives a sidelink setting which may be applied to a specific cell (or specific cells) operating at a non-serving frequency, it may be necessary for the UE to continuously confirm whether the sidelink setting may actually be applied. This confirmation may be performed by checking whether the UE is located within the coverage of the specific cell (namely the cell for which the sidelink setting may be applied).

For example, if the UE notices that the current discovery setting with respect to a non-serving frequency is no longer valid, the UE may not use the discovery setting any more.

If the UE detects that it is located outside the coverage of a cell for which the sidelink setting is applied, the UE may consider that the sidelink setting is no longer valid.

Similarly, if the UE detects that the cell for which the sidelink setting is applied is no longer the best ranked cell at the corresponding frequency, the UE may consider that the sidelink setting is no longer valid.

Even if the invalidated sidelink setting (for example, discovery setting) is no longer used by the UE, the sidelink setting does not necessarily have to be released as long as the serving cell of the UE which has provided the sidelink setting is not changed. After re-entering the coverage of a cell in which the sidelink setting is valid, the UE may use the sidelink setting without requesting a resource again from the serving cell. However, the UE may regard the stored sidelink setting as being valid only for a maximum of K hours without involving validation thereof. The UE deletes the stored sidelink setting after using the stored sidelink setting for K hours without validation thereof. Here, validation refers to a method for maintaining the sidelink setting information up-to-date by receiving a confirmation message of the network indicating that the sidelink setting information is valid or receiving the sidelink setting information directly from a cell providing the sidelink setting information.

[Proposal 5] The UE needs to confirm continuously whether the sidelink setting with respect to a frequency different from a serving frequency is actually applicable. This confirmation may be performed by checking whether the UE is located within the coverage of a cell for which the corresponding frequency may be applied.

[Proposal 6] If it is determined that the sidelink setting (for example, discovery setting) is not valid, the UE may stop using the invalid sidelink setting. At this time, even if the sidelink setting is not valid, the sidelink setting may still be maintained without being released.

Referring again to FIG. 15, suppose the UE is at location A and receives a dedicated discovery setting which may be applied to cell 2 operating at frequency 2. As the UE moves from location A to location B, the UE goes beyond the coverage of the cell 2 operating at the frequency 2 and may enter the coverage of cell 2 operating at the frequency 2. After the UE enters the coverage of the cell 3, the discovery setting may not be applicable for the cell 3. Therefore, the UE stops using the discovery setting. Since the UE does not have a valid discovery setting with respect to the cell 3, the UE may operate according to either of the following two methods.

1. The UE may obtain a discovery setting autonomously from the system information broadcast by the cell 3. The system information may be SIB 19, for example.

2. The UE may transmit sidelink UE information to its serving cell, namely cell 1 and request a new dedicated discovery setting that may be applied to the cell 3 operating at the frequency 2.

The UE may perform the first method at its best efforts. In the second method, if the network does not explicitly inform that the network may provide a dedicated discovery setting that may be applied to the cell 3, the UE is unable to know whether the serving cell provides (or may provide) a dedicated discovery setting that may be applied to the cell 3.

Therefore, broadcasting that a dedicated discovery setting is provided with respect to the frequencies included in a frequency list alone may not be sufficient. It may be necessary to inform of which cells operating at different frequencies the dedicated discovery setting may be applied.

[Proposal 7] The serving cell may indicate a cell for which requesting a discovery resource applicable for inter-frequency discovery is expected. In other words, the serving cell may inform the UE of a list of cells which may provide the inter-frequency discovery setting.

[Proposal 8] If the UE detects that the inter-frequency discovery setting stored in the UE is no longer valid, the UE itself may obtain a valid discovery setting from the system information broadcast from the cell of the corresponding inter-frequency. Similarly, the UE may be requested to transmit sidelink UE information to request a discovery resource according to the instruction of the UE's serving cell.

[Reference Cell for Downlink Measurement and Synchronization]

In sidelink discovery, a serving cell may configure a plurality of transmission resource pools. The plurality of transmission resource pools may be selected according to RSRP (Reference Signal Received Power). In this case, two thresholds which may be compared with the RSRP measurement of the serving cell may be set for each transmission resource pool. The primary cell may be used as a reference for downlink measurement and synchronization.

The UE may be interested in transmitting a discovery signal from a cell operating at a non-primary frequency, not the primary frequency. At this time, a plurality of transmission resource pools may be applied to the cell of the non-primary frequency, and an RSRP-based method may be chosen as a method for selecting a transmission resource pool. In this case, it has to be determined which cell needs to be measured and compared with the threshold for selecting a transmission resource pool.

If the UE has a serving cell activated at the non-primary frequency when transmitting a D2D discovery signal at the non-primary frequency, the activated serving cell is used for downlink measurement and synchronization. Otherwise, one downlink carrier component provided by the network is used for downlink measurement and synchronization for sidelink transmission. At this time, the one downlink carrier component may be 1) a downlink carrier component paired with the carrier component through which the UE performs sidelink transmission or 2) a downlink carrier component not paired with the carrier component through which the UE performs sidelink transmission; and may be signaled to the UE.

To generalize the operating scenario above, if a D2D discovery signal is to be transmitted at a particular frequency, and a serving cell is available at the particular frequency, the UE uses the serving cell as a reference cell. When a serving cell is unavailable at the particular frequency, how to determine a reference cell may become problematic. In this case, one of the following options may be chosen.

Option 1) The UE may determine a cell of a downlink carrier component paired with a carrier component through which the UE itself attempts to perform transmission of a discovery signal as the reference cell.

Option 2) The UE may determine the primary cell as the reference cell.

Option 3) The network may determine which of the two methods to be used.

Option 4) The network may determine the frequency (or reference cell) to be used as a reference by the UE.

In the LTE-A Rel. 12, a UE always uses the primary cell as a reference cell for transmission of a discovery signal. This is so because discovery signal transmission may always occur at the primary frequency. In D2D communication signal transmission, the UE selects a cell operating at a downlink frequency paired with a frequency at which the UE attempts to perform D2D communication signal transmission (which may or may not be the primary frequency) and uses the selected cell as the reference cell.

The option 1 by default adopts the operation based on the LTE-A Rel. 12 and selects an intra-frequency cell as the reference cell. Also, by extending the LTE-A Rel. 12 operation, the reference cell may be chosen at the frequency which is the same as the frequency at which the UE attempts to perform the discovery operation.

The option 2 selects a cell of the inter-frequency as the reference cell. The option 2 may be used to a limited case such as a synchronized heterogeneous network. This is so because, if the UE is interested in transmitting a discovery signal in a synchronized small cell operating at the non-primary frequency, it may be relevant to take into account the primary cell as the reference cell.

The option 3 allows the network to choose between the aforementioned two options (option 1 and 2). If the option 3 is used, which option to use at each frequency may be signaled for flexible network implementation.

The option 4 allows the network to inform of which frequency the UE has to use as a reference. If a specified frequency is a serving frequency, the UE has to use a serving cell of the serving frequency as a reference cell. Similarly, if a specified frequency is a non-serving frequency, the UE has to select a cell operating at the non-serving frequency.

Among the options above, the option 1 may be used by default. Also, the option 3 may be considered. The option 2 has a drawback that it may limit the network implementation for discovery at the non-primary frequency. The option 4 has a drawback that the control offered by the network is more than necessary.

[Proposal 9] The option 1 is used by default, and when the operation goes beyond the scope of the option 1, the option 3 may be used.

<Selection and Measurement of a Cell for Discovery Operation at the Non-Primary Frequency>

When the aforementioned option 1 or 3 is used, it may become problematic how to determine a cell to be used for discovery operation at the non-primary frequency (non-serving frequency).

In the case of transmission of a sidelink communication signal at the non-serving frequency, the best ranked cell at the corresponding frequency may be selected/used. When the best ranked cell is used, interference exerted on other neighbor cells may be reduced. To select the best ranked cell, the UE may have to perform intra-frequency measurement at the non-serving frequency.

In the sidelink operation, the UE may be interested in D2D signal transmission at multiple frequencies. It is not desirable that high capability is enforced for simple commercial services. Therefore, it is preferable to minimize performing intra frequency measurement with respect to a frequency in which the UE is interested for performing D2D signal transmission and acquisition of parameters required for intra frequency measurement. In this respect, even for the sake of sidelink discovery, a method may be needed, which follows a principle of selecting the best ranked cell operating at the corresponding frequency as the reference cell and reduces the measurement burden.

[Proposal 10] For discovery signal transmission at the non-serving frequency, the UE may use the best ranked cell for downlink measurement and synchronization.

To select the best ranked cell, the UE may perform measurement of the corresponding frequency. The UE in the RRC-idle state may perform measurement independently of the priority of a frequency. The UE in the RRC-connected state may perform measurement irrespective of availability of a measurement object with respect to the corresponding frequency.

[Proposal 11] If the UE in the RRC-idle state is interested in discovery signal transmission at the inter-frequency, the UE may perform measurement of the corresponding frequency for the purpose of ranking the corresponding frequency irrespective of the priority of the corresponding frequency.

[Proposal 12] if the UE in the RRC-connected state is interested in discovery signal transmission in a non-serving cell (a cell operating at the inter-frequency), the UE performs measurement of the cell operating at the corresponding frequency irrespective of whether a measurement object is configured with respect to the corresponding frequency.

To perform measurement of the corresponding frequency, the UE has to know the measurement bandwidth.

In the case of intra PLMN/inter-frequency, the carrier frequency to be used for discovery signal transmission may be already included in the SIB 5, through which the UE may distinguish a specific frequency band.

In the case of inter PLMN/inter-frequency, when the corresponding frequency belongs to a different PLMN, frequency information which is the same for the frequency band of the corresponding frequency may not be included in the SIB 5.

With respect to the frequency at which the UE is expected to request a transmission resource, the serving cell may have to signal measurement band information with respect to the frequency through D2D system information (SIB 19 in the case of D2D discovery).

[Proposal 13] The measurement band for frequencies not included in the system information (SIBS) with respect to inter-frequency measurement may be informed through the D2D system information.

To allow the UE to select a cell for which a ranking-based D2D operation is to be performed (which is called a ProSe cell) and to relieve excessive burden on the measurement, the UE may be prohibited from performing inter-frequency measurement over the entire frequencies in which the UE is interested for discovery signal transmission.

[Proposal 14] The UE which attempts to perform D2D operation at an arbitrary frequency included in the same frequency band may select a reference cell by performing intra-frequency measurement only at one frequency among the frequencies and use the reference cell as a reference cell of the D2D operation. Among the plurality of frequencies, the UE may randomly select a frequency at which intra-frequency measurement is performed.

To mitigate the burden accompanying the intra frequency measurement, measurement requirements required when the UE performs intra-frequency measurement—ranking-based selection of a reference cell—may be relieved.

[Proposal 15] A ranking-based ProSe cell may be selected from the measurement of which the requirements have been relieved more than the measurement requirements imposed for intra-frequency measurement.

<Synchronization>

With respect to synchronization, the UE may transmit SLSS (Sidelink Synchronization Signal) every 40 ms. To this purpose, a discovery operation may be supported for the UEs located outside the coverage, which requires more frequent synchronization transmission. A downlink parameter for controlling how often a UE needs to transmit the SLSS may be introduced. The parameter may be called 'syncBehavior'. This parameter may determine the synchronization operation that any UE has to follow to participate in the type 1 discovery. Behavior 1 is Rel-12 operation, and behavior 2 is an operation of transmitting an SLSS every 40 ms. This parameter may be included in the system information (SIB 19) for D2D discovery and may be configured for each cell.

[Proposal 16] The aforementioned parameter 'syncBehavior' may be a cell-specific parameter.

In what follows, an operating method for a UE which attempts to perform a D2D operation (for example, D2D discovery) at a frequency (for example, a non-primary frequency) different from a serving frequency will be described.

Figure 16:
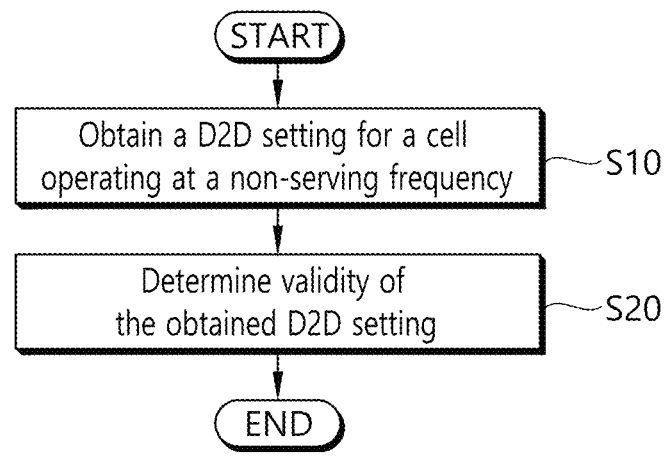
FIG. 16 illustrates an operating method for a UE according to one embodiment of the present invention.

FIG. 16 illustrates an operating method for a UE according to one embodiment of the present invention.

Referring to FIG. 16, the UE obtains a D2D configuration with respect to a cell operating at a non-serving frequency S10. The UE may obtain the D2D configuration with respect to a cell operating at the non-serving frequency by itself or obtain the D2D configuration from a serving cell.

The UE determines validity of the obtained D2D configuration S20.

For example, there may be cases where system information about a cell of a non-serving cell frequency, such as a non-primary carrier component, is changed, and the changed system information may include a D2D configuration about the non-primary carrier frequency and/or other frequency. At this time, in order for the UE and its serving cell to have a valid D2D configuration with respect to the non-primary carrier frequency, the following method may be used.

<Method 1>

In order for a serving cell of the UE to have a valid D2D configuration with respect to a cell operating at the non-primary carrier frequency (non-serving cell), the UE may inform the serving cell of the change of the D2D configuration with respect to the non-serving cell.

For example, if the UE is configured to report the D2D configuration of the non-serving cell or receives a D2D configuration for discovery of the non-serving cell, the UE may check at each modification period whether the D2D configuration including in the system information of the non-serving cell has been changed.

To check change of the D2D configuration of the non-serving cell, the UE may apply a process defined for updating system information. In other words, the UE may monitor a paging message within the modification period of the non-serving cell and check whether change of the system information is informed by the paging message.

Similarly, the UE may check a value tag included in the system information of the non-serving cell. The value tag may be a separate parameter indicating the version of a D2D configuration. The value tag may be included in the SIB 1.

In configuring a UE with a D2D configuration for discovery of a non-serving cell, the network may indicate whether the UE has to check the change of the D2D configuration for discovery of the non-serving cell at each modification period.

If the UE recognizes a change in the D2D configuration included in the system information, the UE may inform its serving cell of the change of the corresponding system information. If receiving a message informing of change of the D2D configuration with respect to a non-serving cell, the serving cell may configure the UE to obtain and report a new D2D configuration with respect to the non-serving cell.

After reporting a D2D configuration upon a request of the serving cell, the UE may periodically check whether system information of the non-serving cell is changed.

Furthermore, if the UE recognizes change of the D2D configuration included in the system information, the UE may obtain a new D2D configuration from the non-serving cell even when there is no separate request from the serving cell and may inform its serving cell of the new D2D configuration.

The change of the D2D configuration may mean either 1) an expected change of the D2D configuration supposed to happen at the next modification period or 2) a change of the D2D configuration already occurred when compared with the contents of a pre-reported D2D configuration.

Figure 17:
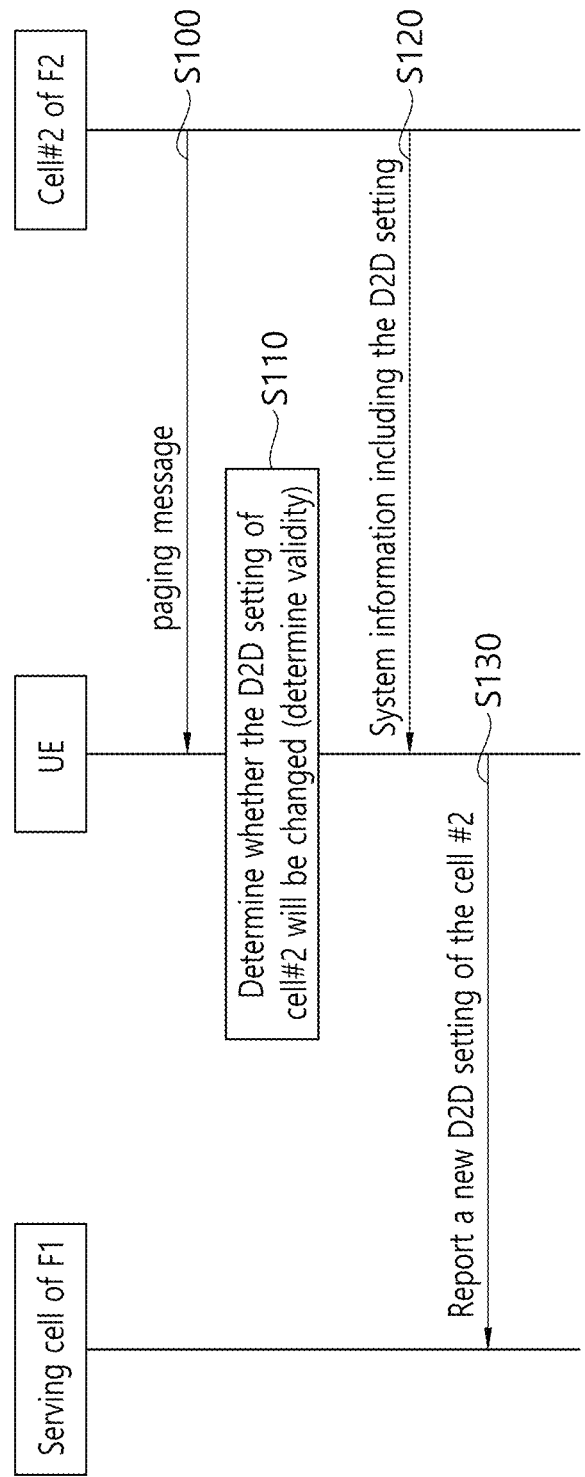
FIG. 17 illustrates an operating method for a UE according to the method 1.

FIG. 17 illustrates an operating method for a UE according to the method 1.

Referring to FIG. 17, the UE receives a paging message from the cell #2 of frequency 2 (F2) S100. The paging message may include information informing that the D2D configuration included in the system information of the cell #2 is supposed to be changed.

The UE determines whether the D2D configuration of the cell #2 will be changed S110. This may be regarded as determining validity of the D2D configuration of the cell #2. If the paging message includes information indicating that the D2D configuration included in the system information of the cell #2 is supposed to be changed, the UE may determine that the D2D configuration of the cell #2, which is currently stored in the UE, is not valid.

The UE receives system information including a new D2D configuration from the cell #2 operating at F2 S120.

The UE reports a new D2D configuration of the cell #2 to its serving cell S130.

Figure 18:
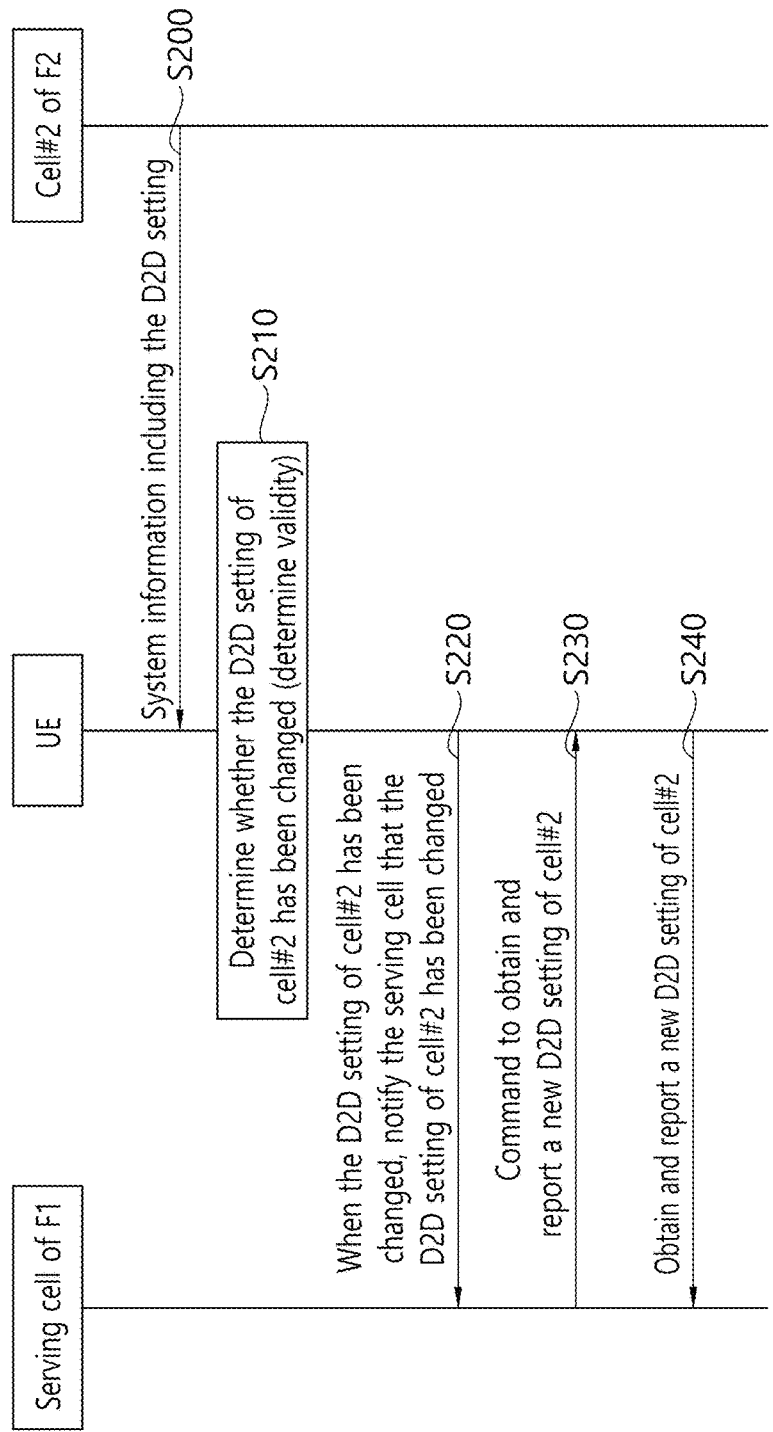
FIG. 18 illustrates another operating method of a UE according to the method 1.

FIG. 18 illustrates another operating method of a UE according to the method 1.

Referring to FIG. 18, the UE receives system information including the D2D configuration from the cell #2 operating at the frequency 2 (F2), S200.

The UE determines whether the D2D configuration of cell #2 has been changed S210. This operation may be regarded as determining validity of the D2D configuration of the cell #2.

For example, suppose the D2D configuration received from the S200 step is a second D2D configuration, and the D2D configuration received before the second D2D configuration is received is a first D2D configuration. Then the UE may determine the occurrence of change by comparing the first and the second D2D configuration.

When it is found from the determination step that the D2D configuration of the cell #2 has been changed, the UE notifies the serving cell of frequency (F1) that the D2D configuration of the cell #2 has been changed S220. The frequency 1 and the frequency 2 may be different from each other.

The serving cell may command the UE to obtain and report a new D2D configuration of the cell #2 S230.

The UE obtains a new D2D configuration of the cell #2 and reports the new D2D configuration to the serving cell S240.

<Method 2>

In the method 1 described above, the UE itself obtains a D2D configuration from a cell operating at a non-serving frequency. In the method 2, however, a serving cell of the UE, which operates at a serving frequency F1, provides a D2D configuration with respect to the cell of a non-serving frequency F2.

When the serving cell provides/configures a D2D configuration that may be applied for discovery in the non-serving cell, validity of the D2D configuration may also be determined. For example, information informing of a time period during which the D2D configuration remains valid may be provided together with the D2D configuration. Receiving the information informing of a valid time period, the UE may consider that the D2D configuration is valid only during the valid time period. After the valid time period, the D2D configuration is discarded; however, if the UE is still interested in discovery in a non-serving cell, the UE may request a D2D configuration from the serving cell. The D2D configuration may also include information about a frequency/ID of a cell to be applied.

Figure 19:
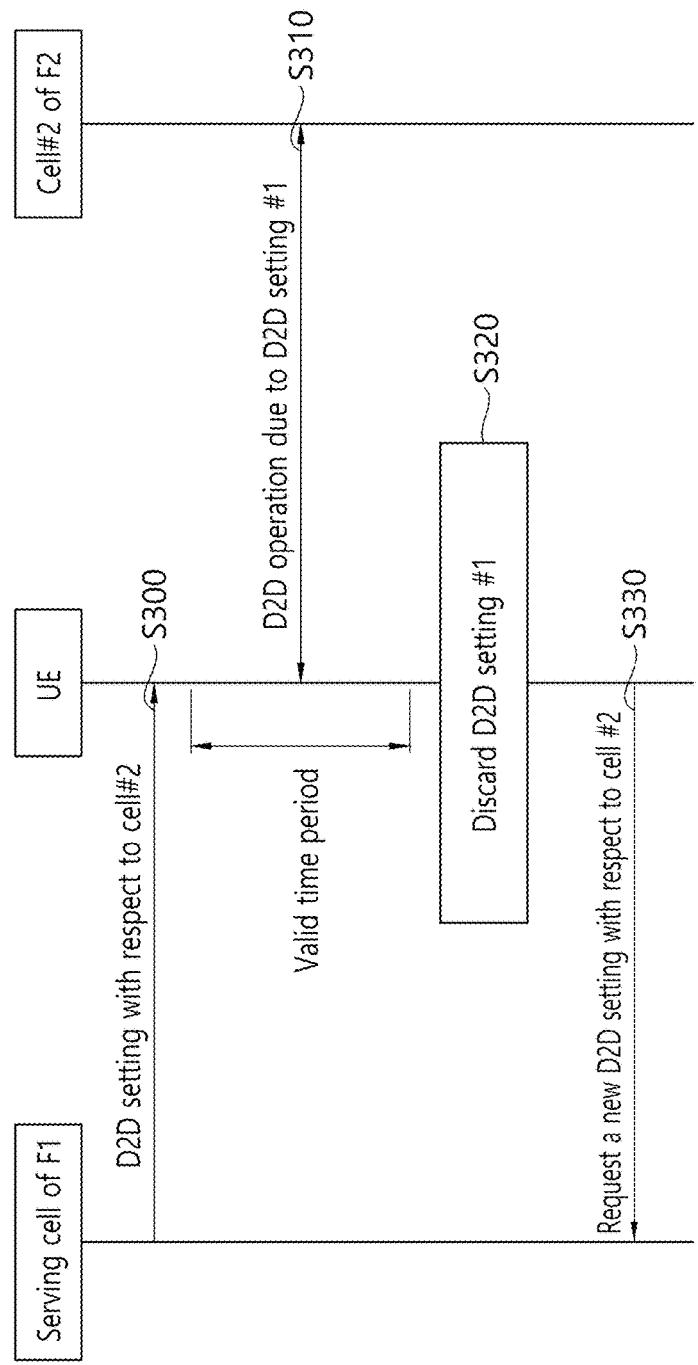
FIG. 19 illustrates a UE operation according to the method 2.

FIG. 19 illustrates a UE operation according to the method 2.

Referring to FIG. 19, the UE receives from a serving cell a D2D configuration #1 with respect to a cell #2 S300. Together with the D2D configuration #1, information indicating a valid time period for which the D2D configuration #1 is valid may be provided.

The UE performs a D2D operation according to the D2D configuration #1 in the cell #2 operating at the frequency 2 (F2) within the valid time period S310. The UE may perform a D2D operation according to other UE and the D2D configuration #1 within the coverage of the cell #2. At this time, the D2D operation may be a D2D discovery operation.

After the valid time period is passed, the UE discards the D2D configuration #1 S320.

The UE requests a new D2D configuration with respect to the cell #2 from the serving cell S330.

The UE may obtain a D2D configuration for a D2D operation in the RRC idle state. To this purpose, when a UE configured to report a D2D configuration for discovery in the non-serving cell gets out of the RRC connected state, the UE maintains a report setting. In the RRC idle state, the UE obtains a D2D configuration; after the UE enters the RRC connected state or establishes an RRC connection, the UE may request the serving cell to make the D2D configuration for the non-serving cell available.

In the embodiment above, a D2D discovery operation has been described as an example for a D2D operation; however, the present invention may also be applied to D2D communication (sidelink communication).

In what follows, a method for reporting a D2D configuration of a neighbor cell will be described.

Figure 20:
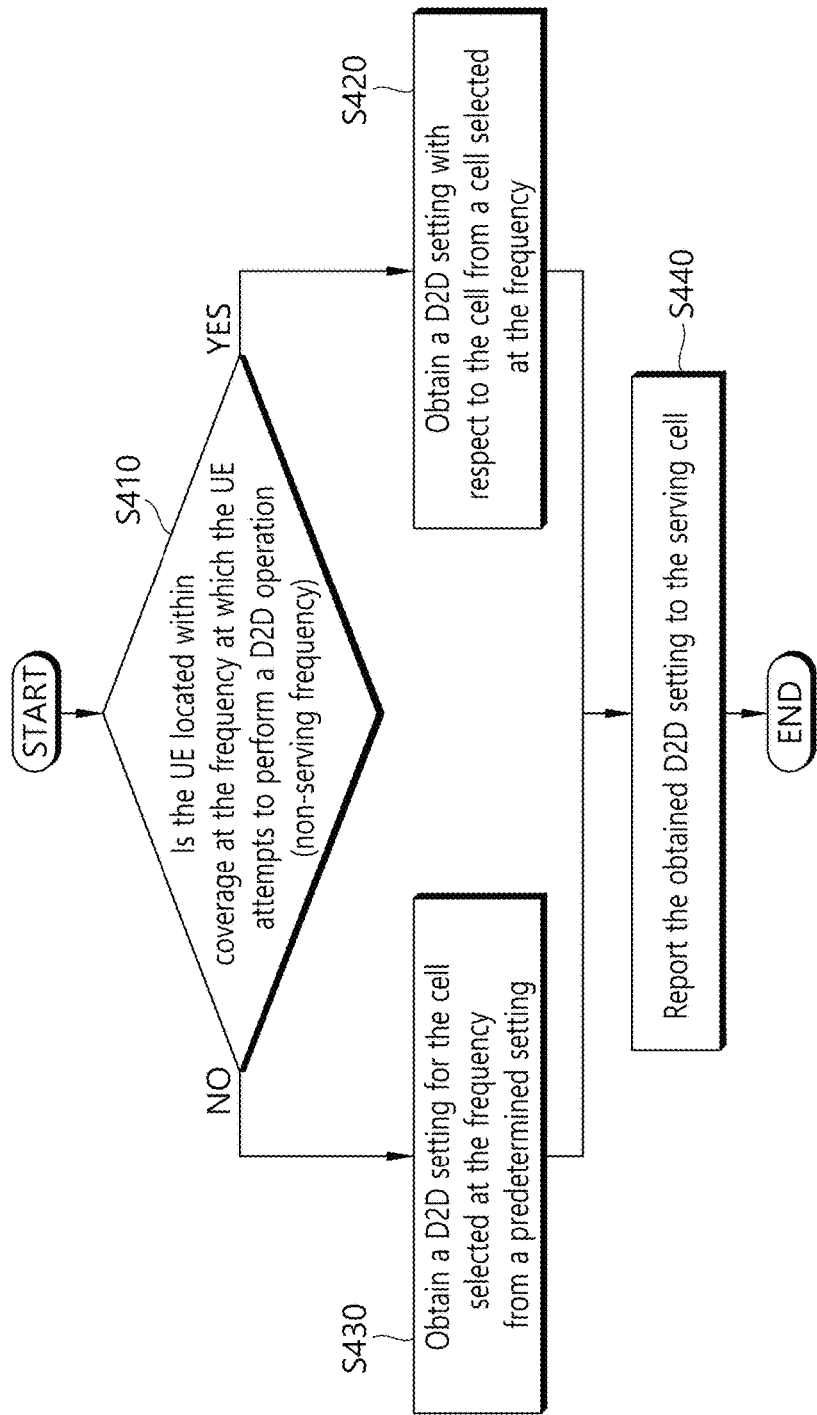
FIG. 20 illustrates a method for reporting a D2D configuration of a neighbor cell.

FIG. 20 illustrates a method for reporting a D2D configuration of a neighbor cell.

Referring to FIG. 20, to determine whether a D2D operation is performed within or out of the coverage of a cell, the UE determines whether the UE is located within the coverage of the cell at the frequency at which the D2D operation is to be performed (non-serving frequency) S410.

In other words, the UE evaluates/determines whether the UE is located within or outside the cell coverage of a specific cell at the frequency in which the UE is interested to perform a D2D operation. Also, the UE may obtain resource setting and timing information of a D2D operation in which the UE is interested.

If the UE is located within the cell coverage at the frequency at which the UE attempts to perform a D2D operation, the UE obtains a D2D configuration of the cell selected at the frequency S420. In other words, if the D2D operation is an operation performed within cell coverage, the UE obtains a resource setting of the cell selected at the frequency at which the UE attempts to perform the D2D operation. The resource setting may be obtained from the selected cell.

The resource setting may include at least one of information elements from among reception resource pool information (for example, 'commRxPool' of SIB 18 and 'discRxPool' of SIB 19), cell ID of an applicable reception resource pool, carrier frequency of the corresponding cell, transmission resource pool information ('commTxPoolNormalCommon' of SIB 18 or 'discTxPoolCommon' of SIB 19), ID of a cell to which the transmission resource pool may be applied, synchronization parameter (for example, 'commSyncConfig' of SIB 18 and 'disSyncConfig' of SIB 19), power control information (for example, 'discTxPowerInfo' of SIB 19), and cell ID of SIB19 obtained by the UE (global cell ID or frequency and physical cell ID).

Also, if a D2D operation is an operation performed within cell coverage, the UE obtains timing of the cell selected at the frequency at which the UE attempts to perform the D2D operation.

The UE calculates a timing difference between the primary cell and the corresponding cell, where the timing difference may be expressed by a frame offset or a subframe offset.

If the UE is requested to report resource settings for a plurality of cells or all of the cells with respect to the corresponding frequency, the UE obtains configuration information of the corresponding cells. The network may inform the UE of the cells the resource settings of which need to be reported by the UE.

If the UE is located outside the cell coverage at the frequency at which the UE attempts to perform an D2D operation, the UE obtains a D2D configuration of the cell selected at the frequency from a predetermined setting S430.

In other words, when a D2D operation is performed outside cell coverage, the UE may obtain the resource setting of the corresponding cell at the frequency at which the UE attempts to perform the D2D operation from a predetermined setting, for example, SL-Preconfiguration.

The table below shows an example of SL-Preconfiguration.

TABLE 2

| - | SL-Preconfiguration-r12 ::= | SEQUENCE { |
| - | preconfigGeneral-r12 | SL-PreconfigGeneral-r12, |
| - | preconfigSync-r12 | SL-PreconfigSync-r12, |

TABLE 2-continued

```
-       preconfigComm-r12           SL-PreconfigCommPoolList4-r12,
-       ...
-   }
-
-   SL-PreconfigGeneral-r12 ::=    SEQUENCE {
-       -- PDCP configuration
-       rohc-Profiles-r12                       SEQUENCE {
-           profile0x0001                       BOOLEAN,
-           profile0x0002                       BOOLEAN,
-           profile0x0004                       BOOLEAN,
-           profile0x0006                       BOOLEAN,
-           profile0x0101                       BOOLEAN,
-           profile0x0102                       BOOLEAN,
-           profile0x0104                       BOOLEAN
-       },
-       -- Physical configuration
-       carrierFreq-r12                     ARFCN-ValueEUTRA-r9,
-       maxTxPower-r12                      P-Max,
-       additionalSpectrumEmission-r12      AdditionalSpectrumEmission,
-       sl-bandwidth-r12            ENUMERATED {n6, n15, n25, n50, n75, n100},
-       tdd-ConfigSL-r12                    TDD-ConfigSL-r12,
-       reserved-r12                        BIT STRING (SIZE (19)),
-       ...
-   }
-
-   SL-PreconfigSync-r12 ::=    SEQUENCE {
-       syncCP-Len-r12                          SL-CP-Len-r12,
-       syncOffsetIndicator1-r12                SL-OffsetIndicatorSync-r12,
-       syncOffsetIndicator2-r12                SL-OffsetIndicatorSync-r12,
-       syncTxParameters-r12                    PO-SL-r12,
-       syncTxThreshOoC-r12                     RSRP-RangeSL3-r12,
-       filterCoefficient-r12                   FilterCoefficient,
-       syncRefMinHyst-r12              ENUMERATED {dB0, dB3, dB6, dB9, dB12},
-       syncRefDiffHyst-r12         ENUMERATED {dB0, dB3, dB6, dB9, dB12, dBinf},
-       ...
-   }
-
-   SL-PreconfigCommPoolList4-r12 :: = SEQUENCE (SIZE (1..maxSL-TxPool-r12)) OF
SL-PreconfigCommPool-r12
-
-   SL-PreconfigCommPool-r12 ::=    SEQUENCE {
-   -- This IE is same as SL-CommResourcePool with rxParametersNCell absent
-       sc-CP-Len-r12                       SL-CP-Len-r12,
-       sc-Period-r12                       SL-PeriodComm-r12,
-       sc-TF-ResourceConfig-r12            SL-TF-ResourceConfig-r12,
-       sc-TxParameters-r12                 PO-SL-r12,
-       data-CP-Len-r12                     SL-CP-Len-r12,
-       data-TF-ResourceConfig-r12          SL-TF-ResourceConfig-r12,
-       dataHoppingConfig-r12               SL-HoppingConfigComm-r12 ,
-       dataTxParameters-r12                PO-SL-r12,
-       trpt-Subset-r12                     SL-TRPT-Subset-r12,
-       ...}
```

If a D2D operation is performed outside cell coverage, the UE may obtain a timing difference between the primary cell and the carrier component for the D2D operation. The UE calculates the timing difference between the primary cell and the corresponding frequency, where the timing difference may be expressed by a frame offset or a subframe offset.

The UE reports a D2D configuration (D2D resource setting) obtained from the serving cell S440.

More specifically, 1) the UE may report the D2D resource setting according to a request of the UE's serving cell. For example, if the serving cell requests, the UE may inform of the obtained D2D resource setting through sidelink UE information. Or 2) if the resource setting is not broadcast by the serving cell, the UE may report the resource setting. The serving cell may not inform of the resource setting with respect to a cell in which a D2D operation is to be performed because the serving cell may be unaware of the resource setting of the corresponding cell. The method 2) may be applied within cell coverage.

Meanwhile, before reporting the whole of the obtained D2D resource setting information to the serving cell, the UE notifies the serving cell that the UE holds the whole of the D2D resource setting information but may not report the whole of the D2D resource setting information until the serving cell requests the UE to report the whole of the D2D resource setting information.

During a DDC connection establishment process, the UE may notify the serving cell that the UE has the whole of the D2D resource setting information. For example, the notification may be sent through an RRC connection establishment completion message. Similarly, sidelink UE information may be used to notify that the UE holds the whole of the D2D resource setting information. The information may be composed of 1 bit.

Also, the UE may inform the serving cell of a frequency at which the D2D resource setting information may be applied. Also, the UE may inform of an ID of a cell to which the D2D resource setting information may be applied.

The network may inform that it may support coordinated scheduling to assist a D2D operation of the UE.

The present invention has been described mostly by using an example of D2D discovery (sidelink discovery); however, the present invention is not limited to the example above but may also be applied to D2D communication (sidelink communication).

Figure 21:
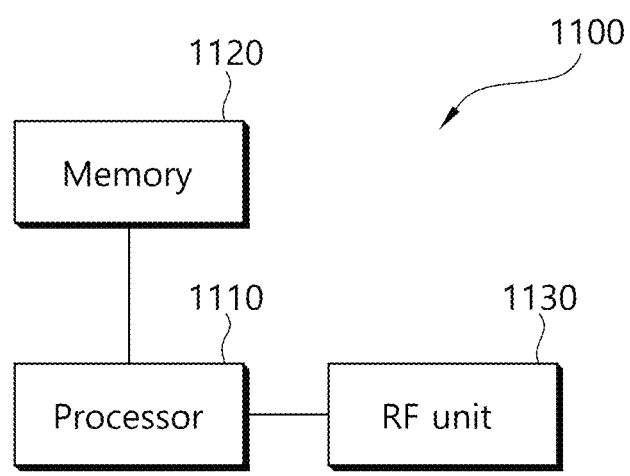
FIG. 21 is a block diagram illustrating a UE in which an embodiment of the present invention is applied.

FIG. 21 is a block diagram illustrating a UE in which an embodiment of the present invention is applied.

Referring to FIG. 21, the UE 1100 includes a processor 1110, memory 1120, and RF (Radio Frequency) unit 1130. The processor 1110 implements a proposed function, process and/or method.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for D2D (Device-to-Device) operation performed by a user equipment (UE) in a wireless communication system, comprising:
    receiving a D2D configuration for a cell in a non-serving frequency; and
    determining validity of the D2D configuration,
    wherein system information including the D2D configuration is received from the cell of the non-serving frequency,
    wherein a change of the D2D configuration is determined by comparing the D2D configuration with a previous D2D configuration, and
    wherein the change of the D2D configuration is reported to a serving cell of the UE, when the D2D configuration has changed from the previous D2D configuration.

2. The method of claim 1 further comprising:
    receiving a paging message from the cell in the non-serving frequency, wherein the D2D configuration is received from the cell in the non-serving frequency when the paging message notifies the UE of a change of the D2D configuration of the cell in the non-serving frequency.

3. The method of claim 2, wherein the received D2D configuration for the cell in the non-serving frequency is reported to the serving cell of the UE.

4. The method of claim 3, wherein a serving frequency at which the serving cell operates and the non-serving frequency are different from each other.

5. The method of claim 1 further comprising:
    receiving a message requesting acquisition and reporting of the D2D configuration from the serving cell.

6. The method of claim 5 further comprising:
    reporting the D2D configuration in response to the message requesting acquisition and reporting.

7. The method of claim 1, wherein the D2D configuration includes time information representing a time period during which the D2D configuration is valid.

8. The method of claim 7 further comprising:
    discarding the D2D configuration when the time period expires.

9. The method of claim 7 further comprising:
    requesting a new D2D configuration from the serving cell when the time period expires.

10. The method of claim 1, wherein the D2D configuration further comprises information representing an identity (ID) of the cell operating at the non-serving frequency to which the D2D configuration is applied.

11. A user equipment (UE), comprising:
    a transmitter and receiver; and
    a processor coupled with the transmitter and receiver, wherein the processor is configured to:
    controlling the receiver to receive a D2D configuration for a cell in a non-serving frequency; and
    determine validity of the D2D configuration,
    wherein system information including the D2D configuration is received from the cell of the non-serving frequency,
    wherein a change of the D2D configuration is determined by comparing the D2D configuration with a previous D2D configuration, and
    wherein the change of the D2D configuration is reported to a serving cell of the UE, when the D2D configuration has changed from the previous D2D configuration.

* * * * *